Patented Jan. 2, 1940

2,185,663

UNITED STATES PATENT OFFICE 2,185,663

METHOD AND SOLUTION FOR PREVENTING FREEZING OF PLANTS

Oliver P. Greenstreet, San Diego, and Thomas C. Hall, La Mesa, Calif.

No Drawing. Application November 12, 1938, Serial No. 240,152

6 Claims. (Cl. 47—2)

This invention relates to a method of preventing freezing of vegetation and a solution for use with such method.

The primary object of the present invention is to provide an improved method or system of preventing the freezing of the branches, leaves, buds, blossoms, etc., of trees and vegetables by enveloping the same in a mist or fog of a liquid which will in this form protect the plant to a certain extent against a lowering temperature and which will deposit upon the various parts of the plant to form a fluid coating having the characteristic of congealing at a certain low temperature point to thus form a protective coating over the plant and thereby insulate the same to a certain extent to prevent the cells of the plant from freezing and rupturing.

A further object of the invention is to provide an improved vegetation protecting fluid containing certain ingredients which, when applied to the plant, will remain fluid so that the breathing activity of the plant will not be interfered with, so long as the surrounding atmosphere temperature remains above a predetermined degree but which will congeal below such predetermined degree to form a protective insulating coating on the plant which will serve to prevent the cell structure from becoming frozen.

Still another object of the invention is to provide an improved method or system of providing frost protection for vegetation, particularly plants of fruit orchards, which is much cheaper to operate than the present method of maintaining a desired atmosphere temperature by the use of heaters and smudge pots, the system at the same time eliminating the troublesome smoke which is produced by orchard heaters and which has resulted in the passage of State requirements for the use of high grade expensive fuel oils.

In carrying out the present method or system of frost protection, the fluid or solution hereinafter described may be distributed over the plants either by the use of suitable hand sprays or by a permanent pipe system connected with a supply tank from which the fluid is fed under pressure of gravity or in any other suitable manner. One example of a method of distributing the plant protecting fluid is by the provision of a suitable storage tank maintained at an elevation whereby when the fluid is allowed to flow therefrom the force of gravity will cause it to flow with considerable rapidity and by connecting such a source of supply with suitable pipes terminating in spray nozzles disposed between the trees or plants to be protected, the fluid may be discharged onto the plant in the form of a vapor or mist. This mist or vapor in the air about the plants will, in itself, provide a certain degree of protection against frost damage and, at the same time, it provides a convenient method of applying the fluid to all parts of the plants as it will be thoroughly disseminated and will, therefore, be deposited as a continuous film over the plant.

In making up a stock of the solution employed in the present freezing preventing system, which stock solution is diluted, as hereinafter described, before use, two separate batches are first prepared as follows.

The first batch consists of petroleum oil, preferably kerosene, water, and an emulsifier mixed as follows. One gallon of kerosene has added thereto, 16 ounces of water to which has been added 16 ounces of sulphonated mineral oil or 16 ounces of sulphonated bitumen, or one quarter pound of powdered ammonium caseinate, or one-half pound powdered potassium caseinate, or ¼ pound any laundry soap, or any other suitable oil emulsifier. This mixture of the water, kerosene, and one of the emulsifiers named is subjected to heat until it is brought substantially to the boiling point.

The second batch comprises a mixture of 4 ounces of glycerine or honey, one-sixteenth pound of powdered blood albumin spreader, and 2 gallons of water. This mixture is then brought substantially to the boiling point and the two batches are then mixed together while still warm and are briskly agitated. During the process of agitating the two mixed batches, there is added to the mixture 10 ounces of alcohol, either wood or denatured. This mixture now constitutes the concentrated or stock solution which is ready for use after being properly diluted.

Various dilutions from the stock solution may be made according to the temperature to which the plants are expected to be exposed and the following table illustrates the various dilutions to be made for protecting the plants against the temperatures given in association with the dilutions.

30 parts of water, 1 part concentrate give freezing protection at 30° F.
25 parts of water, 1 part concentrate give freezing protection at 25° F.
20 parts of water, 1 part concentrate give freezing protection at 20° F.
15 parts of water, 1 part concentrate give freezing protection at 15° F.
10 parts of water, 1 part concentrate give freezing protection at 10° F.

The present spray composition is suitable for use upon any plants in any temperatures but since it has been developed primarily for use in citrus fruit producing districts where the temperature seldom drops below 10° F. no illustration has been given for preparing a solution adapted to resist a temperature lower than this degree but from the foregoing it will be readily apparent what dilutions could be made up from the stock solution which would be effective in temperatures of less than 10° F.

In the mixture described, the glycerine or honey and soap or any of the oils, with the exception of the kerosene, start to set or congeal at a temperature of approximately 30° F. and it is because of this setting or congealing that the desired protection is obtained for the cells of the plant which prevents them from freezing and collapsing. The spray solution forms a film when sprayed at any temperature which does not start to set or congeal enough for freezing protection until the temperature drops to at least 30° F. Below this temperature it sets as stated to form a protective skin or coating but as soon as the temperature rises it again reverts to the fluid condition and permits the plant to continue to breathe in a normal manner.

By the use of the blood albumin a more thorough spreading of the solution is obtained as this substance has a tendency to soften hard water and while its use is not absolutely essential, when it is used a thorough spreading or distribution of the spray is assured.

It will be understood that in making up the stock solution only one of the several emulsifiers enumerated is used and these are employed in the quantities stated for each, the quantities of each of the other ingredients of the solution remaining the same regardless of which emulsifier is employed.

While the kerosene and the emulsifiers, sulphonated mineral oil and sulphonated bitumen, have the additional effect or action of killing certain insects, the principal use of the sulphonated oils is for emulsifying the kerosene and water mixture. The glycerine and honey protects buds, blossoms, twigs and fruits from damage that may occur from the kerosene as well as reacting to lowered temperatures to congeal and afford the desired freezing protection for the cells and the alcohol also acts as an anti-freeze and in addition has a certain value as a destroyer of insects.

It will be understood that the ingredients of the solution congeal, when exposed to low temperatures, only when the stock solution has been thinned out in making the spray solution.

In setting forth the formula for the stock solution, certain proportions have been given for the ingredients but it is to be understood that the invention is not to be held strictly to these exact proportions as slight variations in the same may be made without adversely affecting the final results.

We claim:

1. The herein described method of providing freezing protection for plants which comprises applying to the plant parts an emulsion of petroleum oil and water carrying a simple alcohol.

2. The hereindescribed method of providing freezing protection for plants which comprises applying to the plant parts an emulsion of petroleum oil and water carrying a simple alcohol and honey.

3. The herein described method of providing freezing protection for plants which comprises applying to the plant parts an emulsion of petroleum oil and water carrying a simple alcohol, honey and a solution of blood albumin.

4. A freezing preventing spray for plants consisting of an emulsion of petroleum oil and water having dispersed therethrough glycerine and alcohol.

5. A freezing preventing spray for plants consisting of an emulsion of petroleum oil and water having dispersed therethrough glycerine, alcohol and honey.

6. A freezing preventing spray for plants consisting of an emulsion of petroleum oil and water having dispersed therethrough glycerine, alcohol, honey and blood albumin.

OLIVER P. GREENSTREET.
THOMAS C. HALL.